US012735662B2

(12) United States Patent
Ecklein

(10) Patent No.: US 12,735,662 B2
(45) Date of Patent: Sep. 15, 2026

(54) SYSTEM FOR MATURING LARGE QUANTITIES OF WINE

(71) Applicant: Bryce Ecklein, Friday Harbor, WA (US)

(72) Inventor: Bryce Ecklein, Friday Harbor, WA (US)

( * ) Notice: Subject to any disclaimer, the term of this patent is extended or adjusted under 35 U.S.C. 154(b) by 381 days.

(21) Appl. No.: 18/104,303

(22) Filed: Feb. 1, 2023

(65) Prior Publication Data

US 2024/0301334 A1 Sep. 12, 2024

(51) Int. Cl.
*C12H 1/22* (2006.01)
*C12G 3/07* (2006.01)

(52) U.S. Cl.
CPC *C12H 1/22* (2013.01); *C12G 3/07* (2019.02)

(58) Field of Classification Search
None
See application file for complete search history.

(56) References Cited

U.S. PATENT DOCUMENTS 429,826 A * 6/1890 Wagoner .................. C12G 3/07 99/277.1
2,017,235 A * 10/1935 Drew ....................... C12G 3/07 99/277.1
2,807,547 A * 9/1957 Nickol ..................... C12G 3/07 99/277.2
6,378,419 B1 * 4/2002 Ecklein .................... C12G 3/07 99/277.1
6,966,250 B2 * 11/2005 Eustis ...................... C12H 1/22 99/277.1
9,032,864 B2 * 5/2015 Roleder ................... B65D 9/04 261/87
11,970,678 B2 * 4/2024 Mort ........................ H05B 6/68
2003/0066429 A1 * 4/2003 Eustis ...................... C12H 1/22 99/275
2006/0075901 A1 * 4/2006 Eustis ...................... C12H 1/22 99/277.1
2008/0000356 A1 * 1/2008 Eustis ...................... C12H 1/16 99/277.2
2009/0291175 A1 * 11/2009 Wei ......................... C12H 1/14 99/277.1
2010/0288130 A1 * 11/2010 Eustis ...................... C12H 1/14 99/277.1
2018/0346855 A1 * 12/2018 Davis ....................... C12H 1/18
2019/0177675 A1 * 6/2019 Drori ....................... C12H 1/22

FOREIGN PATENT DOCUMENTS

MD 4250 B1 * 9/2013

* cited by examiner

*Primary Examiner* — Woody A Lee, Jr.

(57) ABSTRACT

A means for maturing large volumes of wine where the wine experiences controlled oxygenation through contact with oak and external air/oxygen sources. Wine from large volume holding tanks (500-10,000+ gallons) is passed through airtight baffle tanks containing cored oak baffles before being returned to the larger holding tank(s).

1 Claim, 2 Drawing Sheets

SYSTEM FOR MATURING LARGE QUANTITIES OF WINE

OVERVIEW

An invention comprised of multiple interacting components to affect the maturation of large quantities of wine. The invention utilizes food-grade elements, connected together via conduits, to bring unaged wine to a desired maturation.

Components include:

1) A bulk wine holding tank of 500 to 10,000 gallons or more
2) An airtight baffle tank or tanks of stainless steel, poly or wood housing one or more oak baffles, the wine undergoing maturation, and an airtight lid to allow change-out of oak baffles
3) Oak baffles where the interiors of the oak baffles are cored (voided) out to allow air passage of supplied external air/oxygen and where external surfaces of the oak baffles that come in contact with unaged wine have indentations and/or grooves to increase contact surface area with wine and where the oak baffles are of any suitable oak species known to produce desirable flavors and phenolic alteration and where oak baffles are toasted on their exterior surface to achieve desired flavors and further, where oak baffles have air passages pneumatically linked together
4) Airtight conduits linking bulk wine holding tank(s) to baffle tank(s) containing oak baffles and airtight conduits to link tanks containing oak baffles back to bulk holding tank
5) A pump to return treated wine from the baffle tanks back to bulk holding tank
6) A pump to supply external air and/or oxygen into the interior of the oak baffles As described further below and with supportive graphics, unaged wine which is housed in bulk holding tanks is gravity fed to baffle tanks which contain cored oak baffles. The unaged wine has a resident time in the baffle tanks where it interacts with the cored oak baffles. The cored oak baffles receive air/oxygen internally from external sources with the result being the invert of traditional oak barrel aging. Wine thus treated is returned to the bulk holding tank(s) by pump. The cycle is repeated until all wine in the holding tank(s) reaches a desired maturation and flavor profile.

This application claims the benefit of provisional patent application Ser. No. 63/307,572 filed Feb. 7, 2023 by the present inventor, which is incorporated by reference in its entirety.

This application uses the cored oak slabs (baffles) disclosed in my U.S. Pat. No. 6,378,419B1, granted Apr. 30, 2002, which is incorporated by reference in its entirety.

BACKGROUND ART

The U.S. Pat. No. 6,378,419B1 (granted to the applicant of the current invention presented herein) achieves, at a smaller scale, the necessary controlled oxygenation of wine through oak. Aging of wine using this methodology and related fabrication has produced outstanding results in total time of maturation, wine quality achieved and cost of fabrication. The current invention, presented herein, provides a new means of oak aging large volumes of wine, heretofore unavailable to production wineries, based on the technology of above cited U.S. Pat. No. 6,378,419B1 but applied in a new, scalable embodiment with associated physical and methodological components.

A review of the limited examples of relevant prior art discloses attempts to address wine aging of larger volumes of wine. Cited disclosures all fail to achieve the oxygenation of wine through oak at a scale, efficiency, or practicality of the current subject invention.

US20190177675A1 shows a series of four actual oak barrels interconnected to each other and to an external wine holding tank. Wine is fed through the barrels for aging and returned to the holding tank. In reality this is nothing much more than what happens in a production winery where numerous, individual, unconnected, barrels are used, and the aged wine produced therein is then cross-blended into one large container before bottling. This prior art relies on the costly use of oak barrels in the first instance and then replacement of same once the oak flavors have been spent to allow continuance of the process. Additionally, the physical accommodation of the barrels requires stacking and accomplishes nothing in terms of space utilization or ease of maintenance. It is doubtful that either the physical aspects or practicality of this invention would be of use to a production winery.

US20200010785A1 (now abandoned) shows a barrel-sized container for aging wine that has both external walls of oak and an internal sealed oak air box that is placed in the wine. The air box is intended to provide a source of additional air to aid the maturation process. The patent describes the prospect of using a single aging tank or connecting several such units together and feeding wine through them from an external tank and then returning the wine to the external tank.

Were such an invention to be placed in a production winery, the drawbacks would become immediately apparent. Not only would the oak used in the container surrounds need to be replaced frequently to provide desired oak flavors, but the internal air box would need to be replaced continuously to achieve an adequate source of fresh air. As with human lungs, once the air in the sealed oak box has been inhaled (passage through the oak to the wine), it is spent and changes chemically to a potentially toxic gas ($CO_2$) which must be removed from the aging wine environs. This invention has no practical application in a production winery and is incapable of maturing larger volumes of wine due to the lack of a continuous air supply for required oxygenation of the wine.

SUMMARY OF THE INVENTION

Because of the high cost of oak barrels, their storage and maintenance requirements, the majority of produced wines never go through barrel aging. This results in an inferior, less complex and less desirable product. The current invention provides a means to obtain proper maturation including desirable flavor profiles and mouth feel through oak aging that can be used economically and efficiently for large quantities of wine. In practice, volumes of unaged wine ranging from 500 gallons to 10,000 gallons and greater, as may be used in production wineries, are suitable for application of this invention. Maturation of the wine is accomplished through controlled oxygenation as is achieved by transfer of oxygen through oak.

The benefit of aging wine in oak barrels has been documented extensively in research papers, trade journals and numerous patent applications. One key finding of all such documentation is the need for subtle, but controlled, oxygenation of the wine being aged by the contact of air through the oak barrel to the wine contained in the barrel. This contact causes a necessary and desirable chemical reaction in which certain compounds and flavors in the oak and wine are extracted and/or modified. Without oxygenation, as occurs in a steel tank, there would be no reduction of harsh tannins in the wine and no integration of the various flavors present in the oak structure or flavonoids present in the wine. Merely placing oak in any form into a volume of wine does not accomplish the same result even when oxygen is introduced directly into the wine. The passage of air through oak, as with an oak barrel, to contact with the wine inside the barrel is the proven and time-honored process for achieving exemplary maturation and flavor profiles. Use of oak barrels, however, has the limitation of volume of wine matured and the high cost of barrels and ongoing maintenance.

The invention presented herein accomplishes the desired maturation for large volumes of wine as may be held in tanks of 500-10,000 gallons (or more) utilizing the placement of cored oak baffles into one or more sealed baffle tanks of either steel, poly or wood. The sealed baffle tanks serve to hold the unaged wine while it matures through coming in contact with the cored oak baffles. The interior of the cored oak baffles receives a continuous supply of air/oxygen via pneumatic conduits connected to external air/oxygen sources.

The cored oak baffles are based on the concept presented in U.S. Pat. No. 637,841,981 as was granted to the applicant of the current invention. The use of the cored oak baffles represents a new application of that concept by indication of a way to mature large volumes of wine.

Wine may be repeatedly circulated from the large holding tank(s) through the baffle tanks and back to the large holding tanks as necessary to gain the desired maturation qualities.

The cored oak baffles may be replaced as needed during the maturation process once desired oak flavors in the baffles have been expended.

The cored oak baffles may be toasted on their exterior faces and may have their exterior surface increased by dimples and/or incisions in the wood.

Any number of baffle tanks can be linked together to match the volume of wine to be matured.

The large holding tank is connected to the baffle tank(s) by means of airtight conduits with flow from the large holding tanks to the baffle tanks by gravity and from the baffle tanks back to the large holding tanks by pump assistance.

THE DRAWINGS

DRAWING DETAILS

Figure 1:
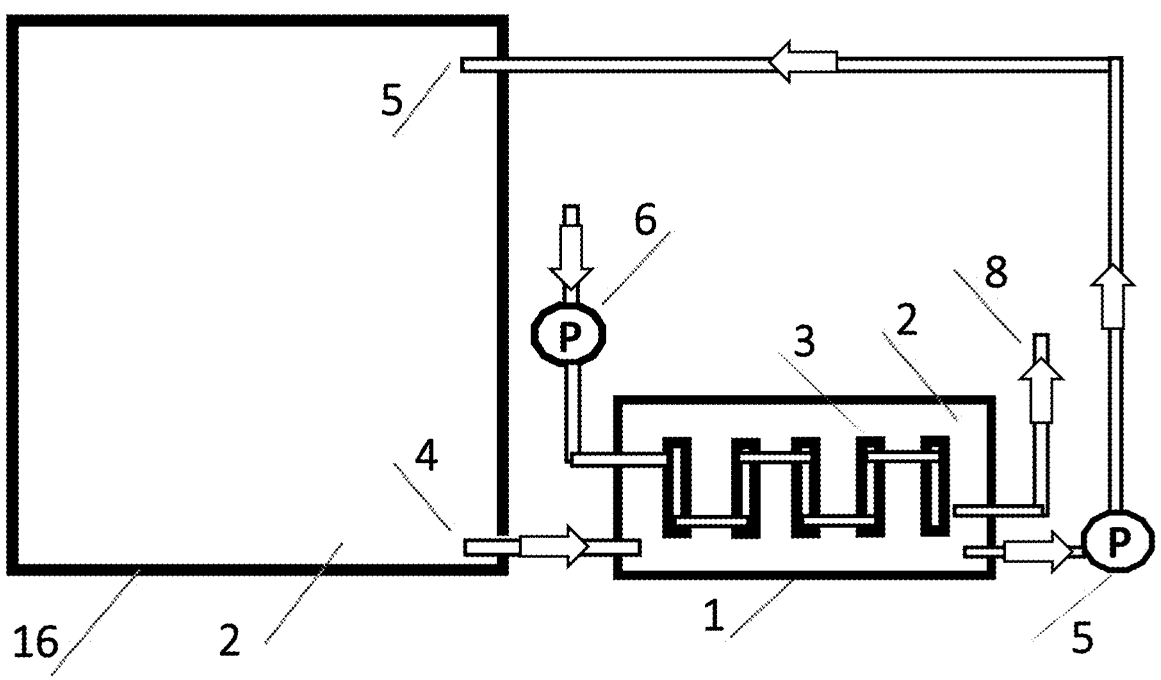
FIG. 1 is cutaway elevational view of the current invention showing the bulk holding tank, the airtight baffle tank and the conduit components to transfer air/oxygen and wine.

FIG. 1 shows the bulk holding tank 16, the airtight baffle tank 1 and the conduit components 4,5,6,7,8 to transfer air/oxygen and wine 2.

Unaged wine 2 held in the bulk holding tank 16 is fed in a conduit 4 by gravity to one or more airtight baffle tanks 1. The wine comes in contact with the cored oak baffles 3 which are resident in the airtight baffle tank(s). After a period of detention in the airtight baffle tank(s), the wine is pumped back to the bulk holding tank via a conduit 5.

A pumped supply of air/oxygen is provided by means of an intake conduit 6 to the cored oak baffles 3. The air/oxygen travels from one baffle to another via connector conduits 7 before exiting the airtight baffle tank(s) back to ambient air via an exit conduit 8.

Figure 2:
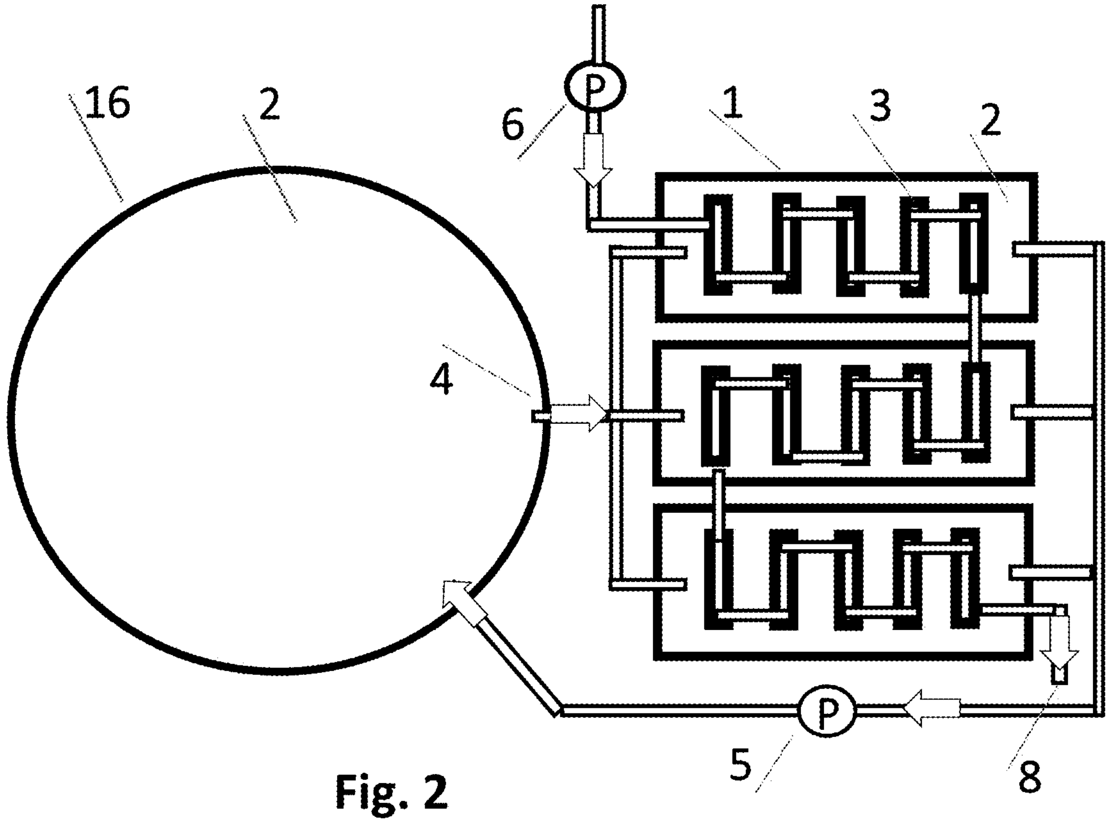
FIG. 2 is a cutaway plan of current invention showing the bulk holding tank, the airtight baffle tanks, as may be utilized in multiples, and the conduit components to transfer air/oxygen and wine.

FIG. 2 shows the bulk holding tank 16, the airtight baffle tanks 1 in multiples and the and the conduit components 4,5,6,7,8 to transfer air/oxygen and wine 2 within the entire system.

In particular, FIG. 2 shows potential multiples (three shown for example) of the airtight baffle tanks 1 connected together to age variable volumes of wine 1 as may come from different sizes of bulk holding tanks 16. Cored oak baffles 3 are shown along with air/oxygen and wine conduits 4,5,6,7,8.

Figure 3:
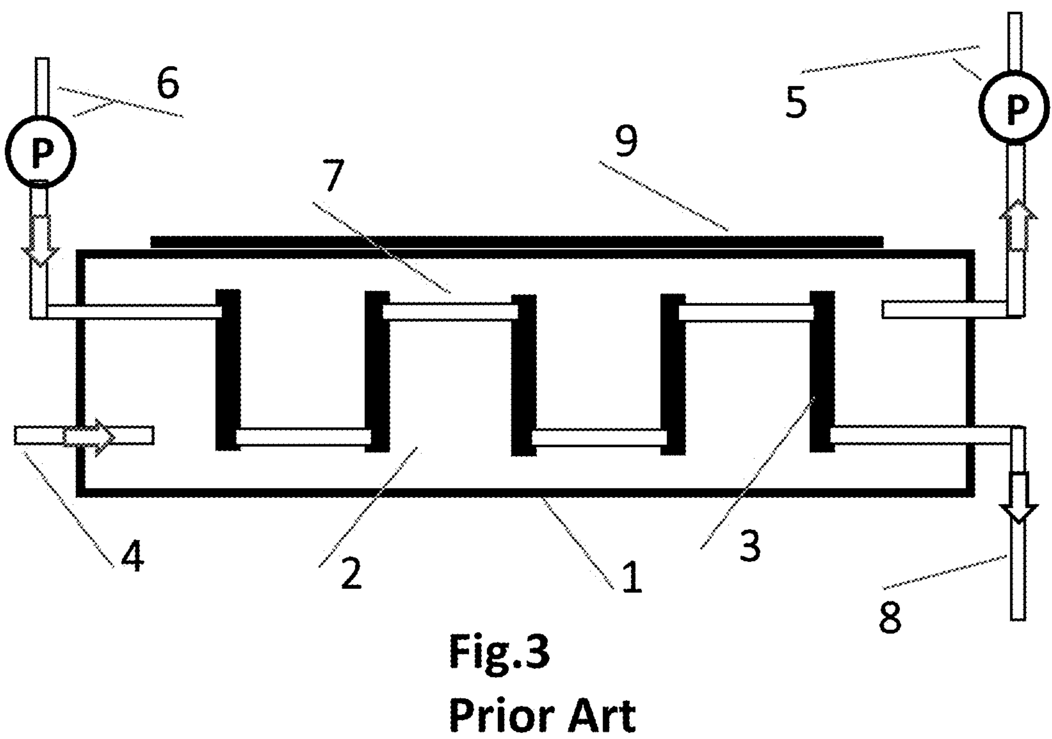
FIG. 3 is a cutaway sideview of the airtight baffle tank showing cored oak baffles and air/oxygen and wine conduit arrangement.

FIG. 3 shows the airtight baffle tank 1 which serves to hold the unaged wine 2 and the cored oak baffles 3.

Unaged wine is introduced to the airtight baffle tank by a valve-controlled, gravity fed intake conduit 4 from the bulk holding tank 16 (reference FIG. 1) where it surrounds and comes in direct contact with the cored oak baffles 3. Once the unaged wine has completed its resident time in the airtight baffle tank, it exits the container through a pump assisted conduit 5 back to the bulk holding tank (reference FIG. 1).

Air/Oxygen is introduced directly into the voided interior of the cored oak baffles by means of a pump-assisted intake conduit 6 capable of being pressurized. The interior voids of each cored oak baffle are connected to each other in daisy chain fashion by connector conduits 7 capable of being pressurized. Air/oxygen is then passed out of the airtight baffle tank back to ambient air from the last cored oak baffle in the chain via an exit conduit 8.

Access to interior of airtight baffle tank(s) for maintenance and change out of cored oak baffles is provided by a removable and sealable lid 9.

Figure 4:
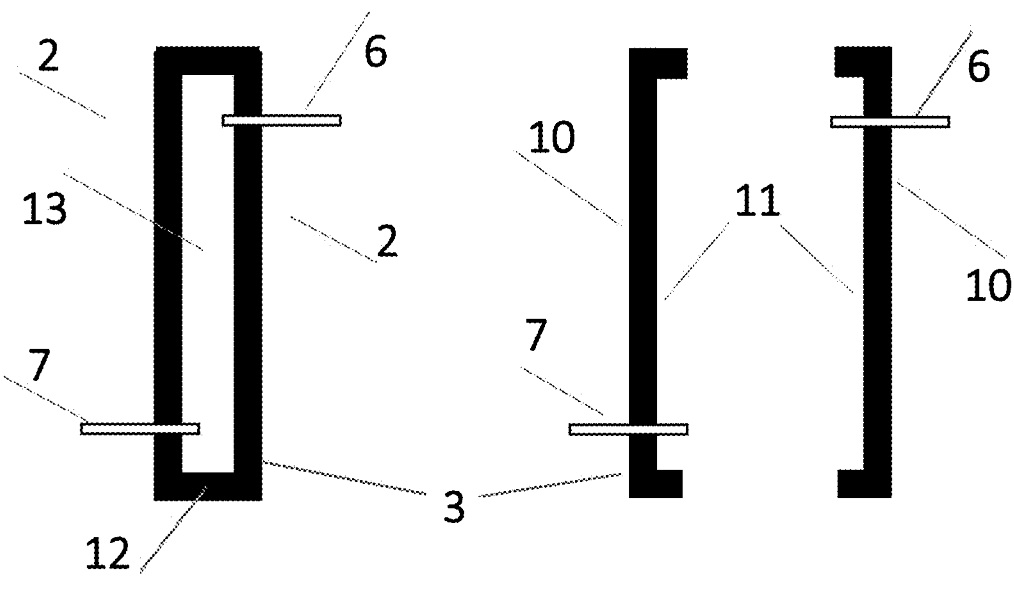
FIG. 4 is a cross-sectional view of the cored oak baffles indicating individual component oak pieces and oak pieces combined to form cored oak baffles.

FIG. 4 shows a cut-away cross-section of the basic construction of the cored oak baffles 3.

Two separate pieces of dimensioned oak 10 are shown with rebated internal faces 11 that, when placed together 12, create an interior void 13. The void becomes the reservoir for exterior air/oxygen necessary for micro-oxygenation through the oak faces to surrounding wine 2. The exterior of the oak faces may be scored or dimpled (not shown) to increase surface area in contact with the wine. The exterior of the oak faces may also be toasted to any desired level. Air/oxygen is introduced to the void by an inlet conduit 6 with air/oxygen exiting the void to the next cored oak baffle through a connector conduit 7.

The invention claimed is:

1. A device for maturation of unaged wines comprising:

a. a liquid flow-through system configured to provide micro-oxygenation by exposing said unaged wine to air or oxygen in the presence of oak;

b. said air or oxygen exposure controlled by a plurality of cored oak baffles resident in an airtight baffle tank, said plurality of cored oak baffles being internally voided to allow air passage, and each of said plurality of cored oak baffles connected pneumatically to at least one other cored oak baffle of the plurality of cored oak baffles and to an external source of the air or oxygen;

c. said airtight baffle tank comprises a removable air-tight lid configured to allow change of said plurality of cored oak baffles;

d. said plurality of cored oak baffles are of singular or mixed oak species and of any toast level;

e. said cored oak baffles have grooves, dimples, or indentations configured to increase an outer surface area in contact with said unaged wine;

f. said unaged wine is supplied by gravity to said airtight baffle tank from an adjacent bulk holding tank and returned to said bulk holding tank by a pump; and g. wherein said airtight baffle tank has a volume of 5 gallons or more.

* * * * *